US008102834B2

(12) United States Patent
Chen et al.

(10) Patent No.: US 8,102,834 B2
(45) Date of Patent: Jan. 24, 2012

(54) METHOD FOR REPORTING AND MANAGING WIRELESS RESOURCES IN TDM SYSTEM

(75) Inventors: Aidi Chen, Shenzhen (CN); Cuifeng Yao, Shenzhen (CN); Zhifeng Ma, Shenzhen (CN)

(73) Assignee: ZTE Corporation, Guangdong (CN)

( * ) Notice: Subject to any disclaimer, the term of this patent is extended or adjusted under 35 U.S.C. 154(b) by 1284 days.

(21) Appl. No.: 11/572,093

(22) PCT Filed: Mar. 30, 2005

(86) PCT No.: PCT/CN2005/000416
§ 371 (c)(1),
(2), (4) Date: Jan. 12, 2007

(87) PCT Pub. No.: WO2006/005240
PCT Pub. Date: Jan. 19, 2006

(65) Prior Publication Data
US 2009/0003288 A1    Jan. 1, 2009

(30) Foreign Application Priority Data

Jul. 14, 2004  (CN) .......................... 2004 1 0068891
Jul. 15, 2004  (CN) .......................... 2004 1 0068969

(51) Int. Cl.
*H04B 7/212* (2006.01)
(52) U.S. Cl. .................... 370/347; 370/442; 370/478
(58) Field of Classification Search .................. None
See application file for complete search history.

(56) References Cited

U.S. PATENT DOCUMENTS

| 6,069,871 | A  | * | 5/2000 | Sharma et al. ................ 370/209 |
| 6,584,330 | B1 | * | 6/2003 | Ruuska ......................... 455/574 |
| 6,996,374 | B1 | * | 2/2006 | Bao et al. .................... 455/67.11 |
| 2004/0125768 | A1 | * | 7/2004 | Yoon et al. ..................... 370/331 |

FOREIGN PATENT DOCUMENTS

| CN | 1369978 | 9/2002 |
| CN | 1394018 | 1/2003 |
| CN | 1426184 | 6/2003 |
| CN | 1469569 | 1/2004 |

OTHER PUBLICATIONS

PCT/CN2005/00416, Mail Date Jan. 16, 2007, English Translation of the International Preliminary Report and Written Opinion.
PCT/CN2005/00416, Mail Date Jun. 17, 2005, International Search Report.

* cited by examiner

*Primary Examiner* — Bob Phunkulh
(74) *Attorney, Agent, or Firm* — Workman Nydegger

(57) ABSTRACT

A method for reporting and managing wireless resources in TDM system comprises the step of reporting the wireless resources comprises a RNC obtaining the resource capacity information of each of the carrier frequency in a cell covered by a base station through the resource audit response message or the resource state indicating message or the resource obstruct message. The RNC can obtain the information of the carrier frequency. According to the method, resource capacity information of each of the carrier frequency in the RNC is in consistency of that of the base station. Thus, the rationality of the carrier frequency and the resource capacity information of the carrier frequency distributed to the service by the RNC can be assured. The success rate of the establishment for a radio link is improved accordingly as to avoid the fact that the radio link establishes on the carrier frequency that is not supported by the base station.

12 Claims, 4 Drawing Sheets

METHOD FOR REPORTING AND MANAGING WIRELESS RESOURCES IN TDM SYSTEM

FIELD OF THE INVENTION

The present invention relates to a management for wireless resources in mobile communication system, especially to a method for reporting and managing wireless resources in Time Division Multiplexing (TDM) system.

BACKGROUND OF THE INVENTION

The wireless resources in the third generation mobile communication system, for example, Time-Division Synchronization Code Division-Multiple-Access (TD-SCDMA) system, are controlled by a Radio Network Controller (RNC). Based on the resource capacity information reported by each Node-B (base station), the RNC decides how to control the wireless resources. Therefore, the wireless resources can be well controlled if the Node-B can provide the RNC with accurate and sufficient resource capacity information.

The Node-B reports wireless resources information to the RNC according to the resource state indicating message and the resource audit response message through the Iub interface.

While the resources in a sub zone have changed, the Node-B will report to the RNC using the resource state-indicating message, as shown in FIG. 1.

The Node-B will audit the resource in the sub zone and report it to the RNC further on after receiving a request for resource audit issued by the RNC, as shown in FIG. 2, so that the resource information of the Node-B conform to that of RNC.

The conventional resource state indicating message and resource audit response message comprise UL Capacity Credit and DL (Global) Capacity Credit of Node-B.

In TD-SCDMA system (a single-carrier system), the UL Capacity Credit and the DL (Global) Capacity Credit are simulated by the Node-B into code channels while spreading factor equals 16. For example, a sub zone covered by the Node-B supports K number of timeslots, wherein m number of timeslots is used as uplink timeslots and n number of timeslots is used as downlink timeslots, and the code channels for uplink and downlink timeslots are referred to as U1CodeNum$_i$(i=1,Λ,m) and D1CodeNum$_j$(j=1,Λ,n), respectively, thus the parameters m and n should be confined by the following equations:

$$K=m+n \leq 7 \quad (1)$$

and the UL Capacity Credit and the DL (Global) Capacity Credit are computed by the following formulas:

$$UL\ Capacity\ Credit = \sum_{i=1}^{m} U1CodeNum_i \quad (2)$$

$$DL\ Capacity\ Credit = \sum_{j=1}^{n} D1CodeNum_j \quad (3)$$

In practical application, however, the number of timeslots supported by a sub zone may be less than 7 after the sub zone is established for some of the timeslots are unusable due to physical resource problems. The information about timeslots TS1, TS2 . . . TS7 could not be included in the UL Capacity Credit and the DL Capacity Credit computed according to the formulas (2) and (3). Referring to FIG. 3, the RNC can't properly obtain either those timeslots unusable or resource capacity information of each timeslot after the UL Capacity Credit and the DL Capacity Credit are reported to the RNC through an Iub interface. Therefore, the resource capacity information between the RNC and the Node-B are of inconsistency.

When a radio link being established, the RNC has to assign some timeslots through Node-B to bear the radio link. Since the RNC doesn't know the availability of each timeslot according to the conventional method of management for wireless resources, the establishment for a radio link will break down if the RNC assigns an unavailable timeslot. Furthermore, a radio link is usually born on several timeslots. The failure for the establishment of radio link will occur once one of the timeslots is unusable. Under the situation, the success rate for the establishment of radio link for the conventional method is low, and the system access performance is badly affected.

At present, the capacity of the TD-SCDMA system is relatively lower than that of the WCDMA system. To increase the capacity of TD-SCDMA system, it is no doubt to be a good manner for using multi-carrier frequencies to cover a cell/sector.

Only may a carrier frequency be chosen to send pilot signal and broadcast message in such a cell/sector covered by multi-carrier frequencies in order to decrease the broadcast channel interference among different carrier frequencies and increase system efficiency. Thus, all carrier frequencies use the same broadcast. For example, there are N numbers of carrier frequencies to cover a cell/sector and to be labeled carrier frequency 1, 2 . . . N respectively. If the carrier frequency 1 is used to send pilot signal and broadcast message, then the others will not be used to send pilot signal and broadcast message any longer. The carrier frequency 1 is called a main carrier frequency, and the others carrier frequencies 2 . . . N are called sub carrier frequency. The main carrier frequency and the sub carrier frequencies use the same scrambling and basic midamble, the same common control channel and have the same configuration of switch point for uplink and downlink. A mobile terminal can obtain system information and frequency configuration of other sub carrier frequencies by searching for the main carrier frequency.

According to the multi-carrier system of the prior art, the resource capacity information for the Node-B is in basis of that of the whole cell, but not for each carrier frequency. Now referring to FIGS. 1 and 2, the Node-B reports to the RNC using the resource state indicating message and the resource audit response message respectively. Thus, the RNC can obtain the resource capacity information of the whole cell from the Node-B, as shown in FIG. 3. However, the resource capacity information between the RNC and the Node-B are of inconsistency, as the resource information of each carrier frequency in the cell is not reported to the RNC.

It is a big problem for the method of reporting the information of the prior art that the RNC cannot be informed once any one of sub carrier frequencies is broken down. As a result, the failure of establishment for radio link will occur as the RNC may still distribute service channel on the sub carrier frequency to be broken down, whereas system access performance may be affected from it badly.

SUMMARY OF THE INVENTION

An object of the present invention is to provide a method for reporting and managing wireless resource in TDM system and to increase the success rate of establishment for radio link and further improve system access performance by the resource information being reported to the RNC.

In order to realize the object, a method for reporting wireless resources in TDM system, comprising steps of a RNC obtaining a resource capacity information in a multi-carrier cell covered by a base station through a resource state indicating message, or a resource audit response message or a resource obstruct message, wherein the resource capacity information in said multi-carrier cell includes a resource capacity information of each carrier frequency.

The step of the RNC obtaining the resource capacity information of each carrier-frequency in a multi-carrier cell through the resource state indicating message further comprises a) the base station detecting that resources in the cell have changed; b) the base station obtaining information of carrier frequencies in the cell and the resource capacity information of each carrier frequency computed by the carrier frequency information according to the physical resource information reserved in the cell; c) the base station computing a resource capacity information of each carrier frequency in the cell; d) the base station filling with the resource capacity information of each carrier frequency and then reporting to the RNC through the resource state indicating message which can distinguish different carrier frequencies; e) after receiving said resource state indicating message, the RNC obtaining not only the resource capacity information of each carrier frequency but also information about unavailable carrier frequency and unavailable timeslots in an available carrier frequency, and then recording all the information;

The step of the RNC obtaining the resource capacity information of each carrier-frequency in multi-carrier cell through the resource audit response message comprises after receiving the resource audit request from the RNC, the base station finding the multi-carrier cell designated by the resource audit request; the base station obtaining the information of each carrier frequency according to the physical resource information reserved in the cell; the base station computing the resource capacity information of each carrier frequency in the cell according to the resource information of each carrier frequency; the base station filling with the resource capacity information of each carrier frequency and reporting to the RNC by the resource audit response message; after receiving the resource audit response message, the RNC obtaining and recording the resource capacity information of each carrier frequency.

The step of the RNC obtaining resource capacity information of each carrier-frequency in multi-carrier cell according to the resource obstruct message comprise the base station obtaining the resource capacity information of each carrier frequency and a carrier frequency that all resources are unusable according to the resource of each carrier frequency obtained; after receiving the carrier frequency that all resource are unavailable and the unusable timeslots in the available carrier frequencies through the resource obstruct message sent by the base station, the RNC sending the resource obstruct response message to the base station; the RNC recording the unavailable carrier frequency and unavailable resources in an available carrier frequencies.

According to the method of the invention, the resource capacity information of each carrier frequency contains the resource capacity information of each timeslot. The resource capacity information of each timeslot can be acquired by timeslot number, code channel number, the amount of timeslots, the amount of code channels and the availability of each code channel.

The method for managing wireless resources in TDM system, comprising a RNC obtaining a resource capacity information of each carrier frequency in a multi-carrier cell covered by a base station through a resource state indicating message, or a resource audit response message or a resource obstruct message; the RNC allocating resources of carrier frequencies to a corresponding service according to the resource capacity information of each carrier frequency as to be obtained.

The step of the RNC obtaining resource capacity information of each carrier frequency in a multi-carrier cell according to the resource state indicating message comprises a) the base station detecting that resources in the cell have changed; b) the base station obtaining information of carrier frequencies in the cell and the resource capacity information of each carrier frequency computed by the carrier frequency information according to the physical resource information reserved in the cell; c) the base station computing a resource capacity information of each carrier frequency in the cell; d) the base station filling with the resource capacity information of each carrier frequency and then reporting to the RNC through the resource state indicating message which can distinguish different carrier frequencies; e) after receiving said resource state indicating message, the RNC obtaining not only the resource capacity information of each carrier frequency but also information about unavailable carrier frequency and unavailable timeslots in an available carrier frequency, and then recording all the information; and the step of the RNC allocating resources of carrier frequencies to a corresponding service comprises evaluating how much resources that the service needs according to the service's feature; comparing the resource that the service needs with the resource capacity information of each carrier frequency.

The step of the RNC obtaining resource capacity information of each carrier frequency in a multi-carrier cell according to the resource audit response message comprises after receiving the resource audit request from the RNC, the base station finding the multi-carrier cell designated by the resource audit request; the base station obtaining the information of each carrier frequency according to the physical resource information reserved in the cell; the base station computing the resource capacity information of each carrier frequency in the cell according to the resource information of each carrier frequency; the base station filling with the resource capacity information of each carrier frequency and reporting to the RNC by the resource audit response message; after receiving the resource audit response message, the RNC obtaining and recording the resource capacity information of each carrier frequency; and the step of the RNC allocating resources of carrier frequencies to a corresponding service comprises evaluating how much resources that the service needs according to the service's feature; comparing the resource that the service needs with the resource capacity information of each carrier frequency.

The step of the RNC obtaining the resource capacity information of each carrier frequency in a multi-carrier cell through the resource obstruct message comprises the base station obtaining the resource capacity information of each carrier frequency and a carrier frequency that all resources are unusable according to the resource of each carrier frequency obtained; after receiving the carrier frequency that all resource are unavailable and the unusable timeslots in the available carrier frequencies through the resource obstruct message sent by the base station, the RNC sending the resource obstruct response message to the base station; the RNC recording the unavailable carrier frequency and unavailable resources in an available carrier frequencies; and the step of the RNC allocating resources of carrier frequencies to a corresponding service comprises evaluating how much resources that the service needs according to the service's feature; comparing the resource that the service needs with the resource capacity information of each carrier frequency.

According to the method of the invention, the resource capacity information of each carrier frequency contains resource capacity information of each timeslot. The resource capacity information of each timeslot can be acquired by timeslot number, code channel number, the amount of timeslots, the amount of code channels and the availability of each code channel.

The resources that the RNC allocates to the services comprise each carrier frequency. The resources of each carrier frequency that the RNC allocates to the services comprise timeslots of each carrier frequency.

According to the method of the present invention, the RNC can acquire the actual resource capacity information of the base station accurately since the resource information of each carrier frequency is provided by the base station while the base station reports wireless resource information of the TDM system to the RNC via the resource state indicating message, the resource audit response message and the resource obstruct message. Therefore, the method of the present invention can efficiently allocate carrier frequencies to the service while a radio link is established in accordance with the resource capacity information of each carrier frequency and improve the success rate of establishment for user service further on to avoid the fact that a radio link bears an unusable carrier frequency.

BRIEF DESCRIPTION OF THE DRAWINGS

The present invention will now be described in details with accompanying drawings and preferred embodiments, which however, won't be used as a limitation to the invention.

DETAILED DESCRIPTION OF THE PREFERRED EMBODIMENTS

Figure 1:
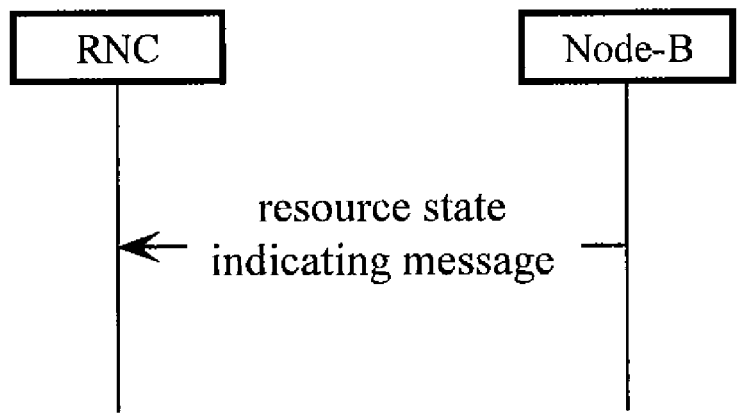
FIG. 1 is a schematic view of TD-SCDMA system of the prior art, showing that Node-B sends the resource state-indicating message to the RNC.
Figure 4:
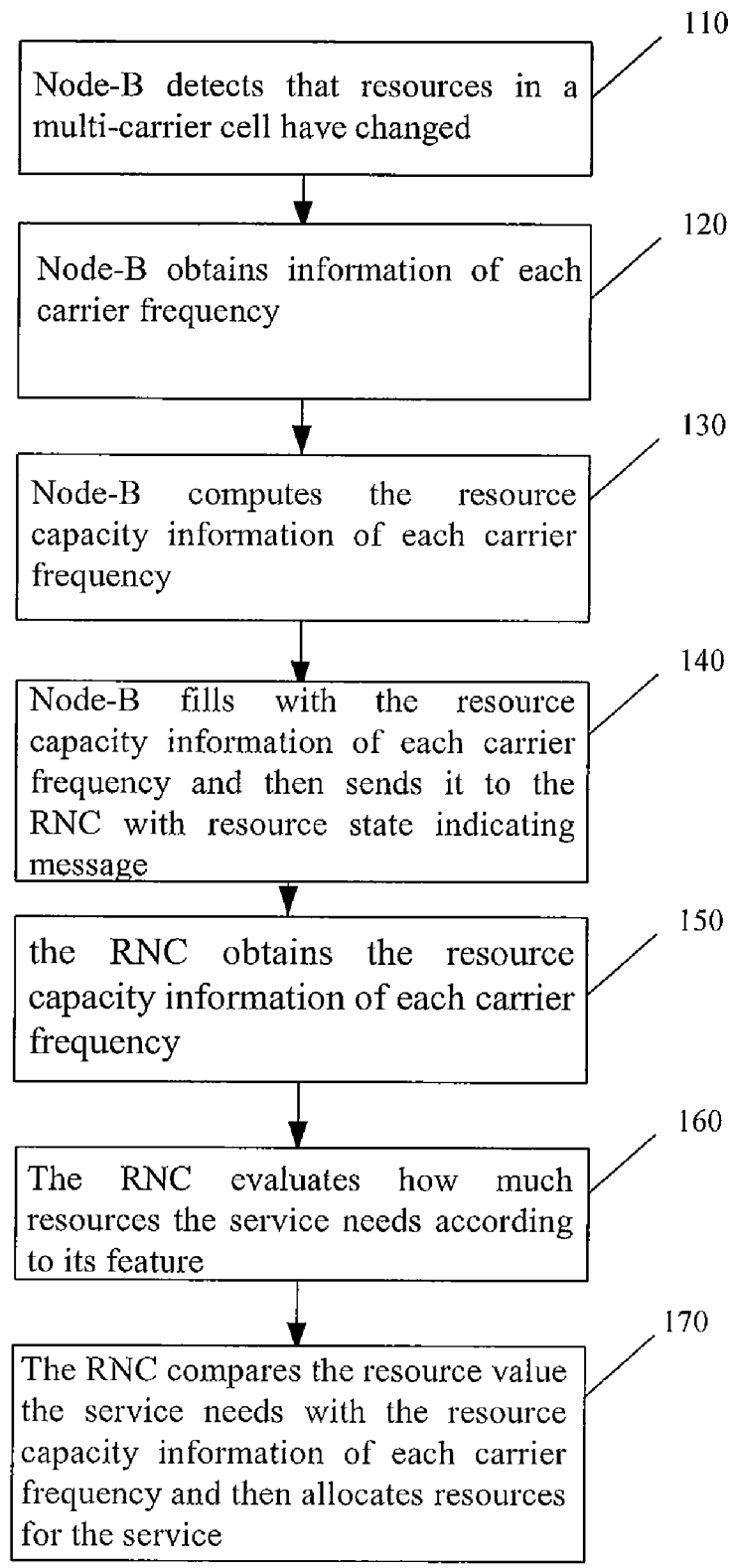
FIG. 4 is a flowchart for the process of reporting and allocation resource according to the first embodiment of the present invention.

According to the first embodiment of the Invention, the Node-B also reports the resource information to RNC through the resource state indicating message, as shown in FIG. 1. Now referring to FIG. 4, however, the process of reporting and allocation resource in accordance with the invention will be described in details as follows.

In Step 110, Node-B detects that resources in a multi-carrier cell have changed.

In Step 120, according to the physical resource information reserved in the cell, Node-B obtains the information of carrier frequencies in the cell and the timeslots information.

In Step 130, Node-B computes the resource capacity information of each carrier frequency in the cell. The resource capacity information of each carrier frequency comprises resource information of each timeslot which can be acquired by timeslot number, code channel number, the amount of timeslots, the amount of code channels and the availability of each channel.

In Step 140, Node-B fills with the resource capacity information of each carrier frequency in which the resource capacity information of each timeslot is provided and then reports to the RNC through the resource state-indicating message that can distinguish different carrier frequencies.

In Step 150, after receiving the resource state-indicating message, the RNC can obtain not only the resource capacity information of each carrier frequency but also the information about unavailable carrier frequency and unavailable timeslots, and then records all the information.

In Step 160, the RNC evaluates how many resources the service needs according to its feature while establishing a user service.

In Step 170, the RNC compares the resource that the service needs with that of each carrier frequency and then allocates resources for the service, including carrier frequencies, timeslots in one carrier frequency and code channels in one timeslot and so on.

Figure 2:
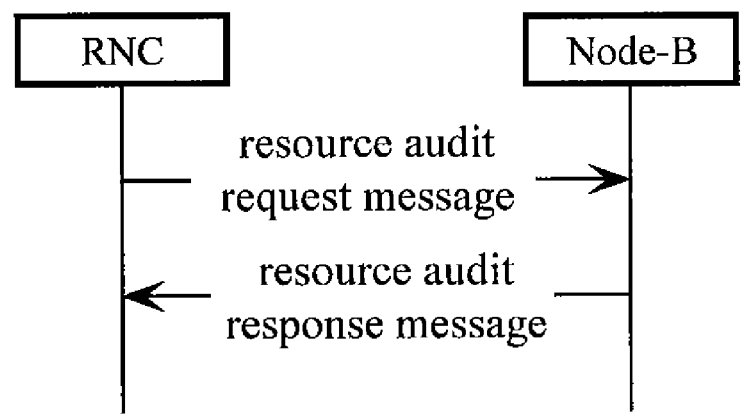
FIG. 2 is another schematic view of TD-SCDMA system of the prior art, showing that a request and corresponding response for resource audit are sent between the Node-B and the RNC.
Figure 3:
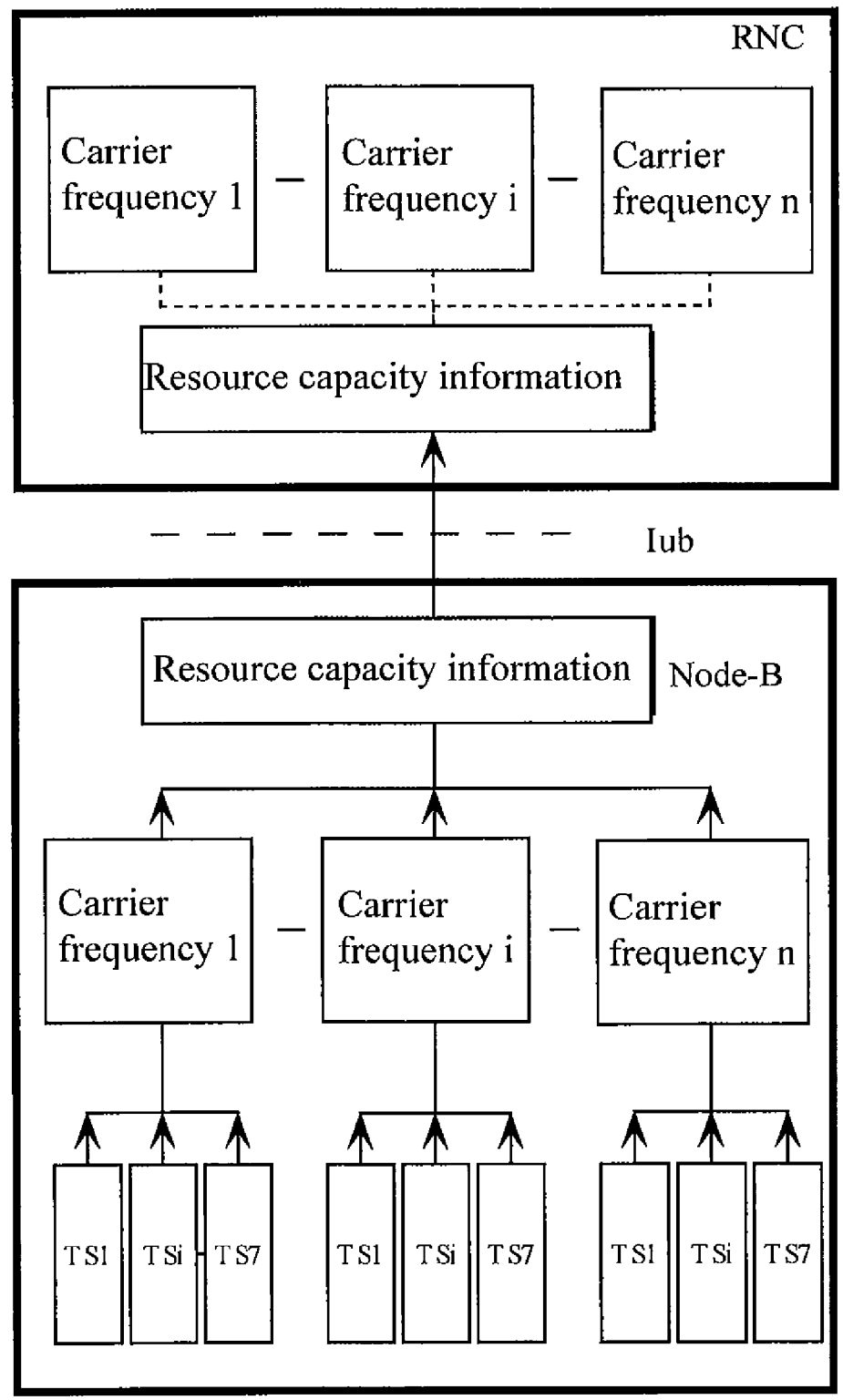
FIG. 3 is a block diagram for reporting the resource capacity information to the RNC of the prior art.

According to the second embodiment of the invention, the Node-B can report resource information to the RNC through a resource audit response message if the RNC sends a resource audit message, return back to FIG. 2. The process of reporting and allocation resource in accordance with the present invention will be described as follows.

In Step 210, after receiving the resource audit request from the RNC, the Node-B finds the multi-carrier cell designed by the request.

In Step 220, according to the physical resource information reserved in the cell, the Node-B can obtain carrier frequencies in the cell and information of each carrier frequency.

In Step 230, the Node-B computes the resource capacity information of each carrier frequency in the cell according to the information of each carrier frequency. The resource capacity information of each carrier frequency contains the resource capacity information of each timeslot which can be acquired by timeslot number, code channel number, the amount of timeslots, the amount of code channels and the availability of each channel.

In Step 240, the Node-B fills with the resource capacity information of each carrier frequency and then sends it to the RNC through the resource audit response message.

In Step 250, after receiving the resource audit response message, the RNC obtains and records the resource information according to the resource capacity information of each carrier frequency.

In Step 260, the RNC evaluates how many resources the service needs according to its feature while establishing a user service.

In Step 270, the RNC compares the resource which the service needs with the resource capacity information of each carrier frequency and then allocates resources for the service. The resources allocate to the service by the RNC includes the timeslots resource.

Figure 5:
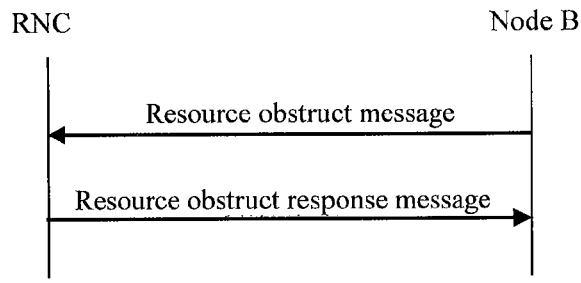
FIG. 5 is a schematic view of TD-SCDMA system of the present invention, showing that the Node-B sends the resource obstruct message to the RNC.

Now referring to FIG. 5, according to the third embodiment of the invention, the Node-B reports the unavailable resources to the RNC through the resource obstruct message.

In Step 310, the Node-B obtains the resource information of each carrier frequency and then gets the resource capacity information of each carrier frequency and carrier frequency that all of resources are unavailable. The resource information of each carrier frequency contains the resource information of each timeslot which can be acquired by timeslot number, code channel number, the amount of timeslots, the amount of code channels and the availability of each code channel.

In Step 320, the Node-B sends a resource obstruct message to the RNC for reporting the carrier frequencies that all of resource are unusable and the unusable timeslots in an available carrier frequency.

In Step 330, after receiving the resource obstruct message, the RNC gets and records the unavailable carrier frequencies and unavailable timeslots in an available carrier frequency. In addition, the RNC sends a resource obstruct response message back to the Node-B, as FIG. 5 describes.

In Step 340, the RNC evaluates the resources that the service needs according to its feature while establishing a user service.

In Step 350, the RNC just allocates the available carrier frequencies and the available resource in an available carrier frequency for the service in which resource of the timeslots are provided.

Figure 6:
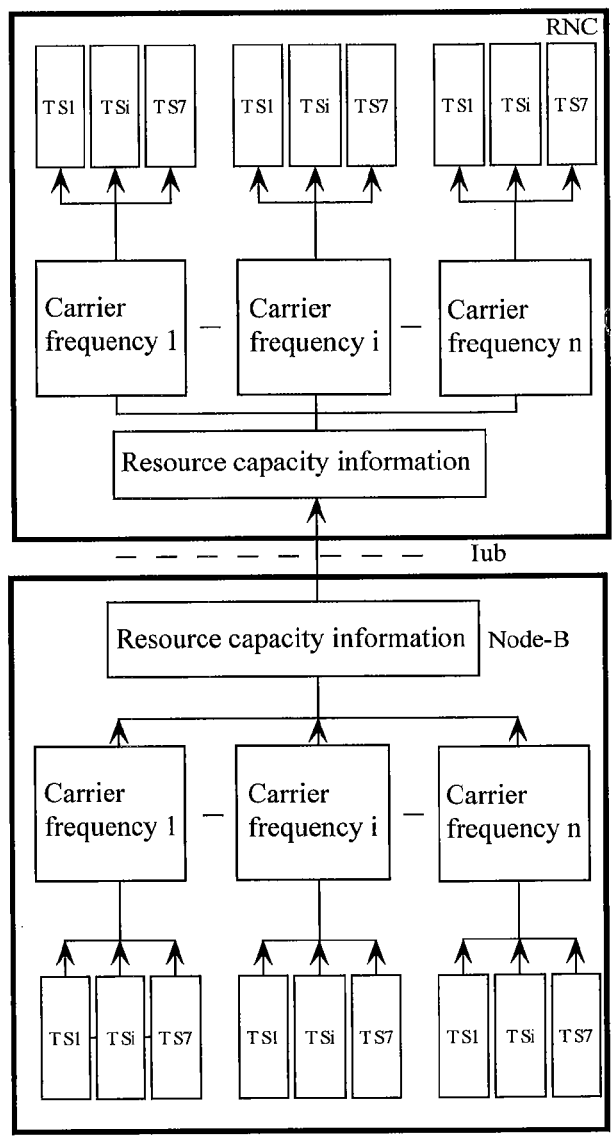
FIG. 6 is a block diagram for reporting the resource capacity information to the RNC of the present invention.

As described above, the Node-B can reports a multi-carrier cell's wireless resources to the RNC through the resource state indicating message, the resource audit response message and the resource obstruct message according to the resource capacity information of each frequency. According to the method of the present invention, the RNC can get information of each carrier frequency and the available resources in a carrier frequency, and knows the real resource capacity information in the cell accurately. Referring to FIG. 6, both the RNC and the Node-B have the resource capacity information of each timeslots (Tsi).

Therefore, according to the method of present invention, it efficiently realizes the rationality that the RNC distributes carrier frequencies and resource capacity information of carrier frequency to the service can be ensured, and prevent the radio link from bearing on the carrier frequency which is unusable to increase the success rate of user service establishment.

Even through numerous characteristics and advantages of the present invention has been set forth in the foregoing description in the way of illustration but not limitation of the invention, people skilled in the art are enable to make variant changes and modifications without departing from the spirit and principles of the present invention to the full extent indicated by the broad meaning of terms in which the appended claims are expressed.

THE INDUSTRY APPLICATION

The Node-B can reports a multi-carrier cell's wireless resources to the RNC through the resource state indicating message, the resource audit response message and the resource obstruct message according to the resource capacity information of each frequency. According to the method of the present invention, the RNC can get information of each carrier frequency and the available resources in a carrier frequency, and knows the real resource capacity information in the cell accurately. Referring to FIG. 6, both the RNC and the Node-B have the resource capacity information of each timeslots (Tsi). Both the RNC and Node-B have the resource capacity information of each timeslots (Tsi), so they have the same resource capacity information. Therefore, according to the method of present invention, it efficiently realizes the rationality that the RNC distributes carrier frequencies and resource capacity information of carrier frequency to the service can be ensured, and prevent the radio link from bearing on the carrier frequency which is unusable to increase the success rate of user service establishment. The present invention is also applicable for other multi-carrier TDM systems.

What is claimed is:

1. A method for reporting wireless resources in TDM system, the method comprising:
   a RNC obtaining a resource capacity information in a multi-carrier cell covered by a base station through at least one of a resource state indicating message, a resource audit response message, and a resource obstruct message,
   wherein the resource capacity information in said multi-carrier cell includes a resource capacity information of each carrier frequency;
   wherein the resource capacity information of each carrier frequency contains the resource capacity information of each timeslot;
   wherein the resource capacity information of each timeslot can be acquired by timeslot number, code channel number, an amount of timeslots, an amount of code channels and an availability of each code channel.

2. The method according to claim 1, wherein the step of the RNC obtaining the resource capacity information of each carrier-frequency in a multi-carrier cell through the resource state indicating message comprises:
   a) the base station detecting that resources in the cell have changed;
   b) the base station obtaining information of carrier frequencies in the cell and the timeslots information according to the physical resource information reserved in the cell;
   c) the base station computing a resource capacity information of each carrier frequency in the cell;
   d) the base station filling with the resource capacity information of each carrier frequency and then reporting to the RNC through the resource state indicating message which can distinguish different carrier frequencies; and
   e) after receiving said resource state indicating message, the RNC obtaining not only the resource capacity information of each carrier frequency but also information about unavailable carrier frequency and unavailable timeslots in an available carrier frequency, and then recording all the information.

3. The method according to claim 1, wherein the step of the RNC obtaining the resource capacity information of each carrier-frequency in multi-carrier cell through the resource audit response message comprises:
   after receiving the resource audit request from the RNC, the base station finding the multi-carrier cell designated by the resource audit request;
   the base station obtaining the information of each carrier frequency according to the physical resource information reserved in the cell;
   the base station computing the resource capacity information of each carrier frequency in the cell according to the resource information of each carrier frequency;
   the base station filling with the resource capacity information of each carrier frequency and reporting to the RNC by the resource audit response message;
   after receiving the resource audit response message, the RNC obtaining and recording the resource capacity information of each carrier frequency.

4. The method according to claim 1, wherein the step of the RNC obtaining resource capacity information of each carrier-frequency in multi-carrier cell according to the resource obstruct message comprises:
   the base station obtaining the resource capacity information of each carrier frequency and a carrier frequency that all resources are unusable according to the resource of each carrier frequency obtained;

after receiving the carrier frequency that all resource are unavailable and the unusable timeslots in the available carrier frequencies through the resource obstruct message sent by the base station, the RNC sending the resource obstruct response message to the base station;

the RNC recording the unavailable carrier frequency and unavailable resources in an available carrier frequencies.

5. A method for managing wireless resources in TDM system, the method comprising:

a RNC obtaining a resource capacity information of each carrier frequency in a multi-carrier cell covered by a base station through at least one of a resource state indicating message, a resource audit response message, and a resource obstruct message;

the RNC allocating resources of carrier frequencies to a corresponding service according to the resource capacity information of each carrier frequency as to be obtained;

wherein the resource capacity information of each carrier frequency contains resource capacity information of each timeslot;

wherein the resource capacity information of each timeslot can be acquired by timeslot number, code channel number, an amount of timeslots, an amount of code channels and an availability of each code channel.

6. The method according to claim 5, wherein the step of the RNC obtaining resource capacity information of each carrier frequency in a multi-carrier cell according to the resource state indicating message comprises:

a) the base station detecting that resources in the cell have changed;

b) the base station obtaining information of carrier frequencies in the cell and the resource capacity information of each carrier frequency computed by the carrier frequency information according to the physical resource information reserved in the cell;

c) the base station computing a resource capacity information of each carrier frequency in the cell;

d) the base station filling with the resource capacity information of each carrier frequency and then reporting to the RNC through the resource state indicating message which can distinguish different carrier frequencies;

e) after receiving said resource state indicating message, the RNC obtaining not only the resource capacity information of each carrier frequency but also information about unavailable carrier frequency and unavailable timeslots in an available carrier frequency, and then recording all the information; and the step of the RNC allocating resources of carrier frequencies to a corresponding service comprises evaluating how much resources that the service needs according to the service's feature;

comparing the resource that the service needs with the resource capacity information of each carrier frequency.

7. The method according to claim 6, wherein the resources that the RNC allocates to the services comprise each carrier frequency.

8. The method according to claim 7, wherein the resources of each carrier frequency that the RNC allocates to the services comprise timeslots of each carrier frequency.

9. The method according to claim 5, wherein the step of the RNC obtaining resource capacity information of each carrier frequency in a multi-carrier cell according to the resource audit response message comprises:

after receiving the resource audit request from the RNC, the base station finding the multi-carrier cell designated by the resource audit request;

the base station obtaining the information of each carrier frequency according to the physical resource information reserved in the cell;

the base station computing the resource capacity information of each carrier frequency in the cell according to the resource information of each carrier frequency;

the base station filling with the resource capacity information of each carrier frequency and reporting to the RNC by the resource audit response message;

after receiving the resource audit response message, the RNC obtaining and recording the resource capacity information of each carrier frequency; and the step of the RNC allocating resources of carrier frequencies to a corresponding service comprises evaluating how much resources that the service needs according to the service's feature;

comparing the resource that the service needs with the resource capacity information of each carrier frequency.

10. The method according to claim 9, wherein the resources that the RNC allocates to the services comprise each carrier frequency.

11. The method according to claim 5, wherein the step of the RNC obtaining the resource capacity information of each carrier frequency in a multi-carrier cell through the resource obstruct message comprises:

the base station obtaining the resource capacity information of each carrier frequency and a carrier frequency that all resources are unusable according to the resource of each carrier frequency obtained;

after receiving the carrier frequency that all resource are unavailable and the unusable timeslots in the available carrier frequencies through the resource obstruct message sent by the base station, the RNC sending the resource obstruct response message to the base station;

the RNC recording the unavailable carrier frequency and unavailable resources in an available carrier frequencies; and the step of the RNC allocating resources of carrier frequencies to a corresponding service comprises evaluating how much resources that the service needs according to the service's feature;

comparing the resource that the service needs with the resource capacity information of each carrier frequency.

12. The method according to claim 11, wherein the resources that the RNC allocates to the services comprise each carrier frequency.

* * * * *